Oct. 5, 1965 J. MAGILL ETAL 3,210,528

BINARY CODED TERNARY COMPUTER SYSTEM

Filed June 18, 1962 4 Sheets-Sheet 1

INVENTORS.
Jack Magill &
Daniel Ashler
BY
Millman and Jacobs
ATTORNEY.

INVENTORS.
Jack Magill &
Daniel Ashler
BY Millman and Jacobs
ATTORNEY.

BINARY CODED TERNARY COMPUTER SYSTEM

Filed June 13, 1962

INVENTORS.
Jack Magill &
Daniel Ashler
BY Millman and Jacobs
ATTORNEY.

BINARY CODED TERNARY COMPUTER SYSTEM

Filed June 18, 1962 4 Sheets-Sheet 4

INVENTORS.
Jack Magill &
Daniel Ashler
BY
ATTORNEY.

United States Patent Office 3,210,528

Patented Oct. 5, 1965

3,210,528

BINARY CODED TERNARY COMPUTER SYSTEM

Jack Magill, 2121 Bryn Mawr Ave., Philadelphia, Pa., and Daniel Ashler, Philadelphia, Pa.; said Ashler assignor to said Magill Filed June 18, 1962, Ser. No. 203,278
9 Claims. (Cl. 235—155)

This invention relates generally to electronic computers and more particularly to electronic digital computers utilizing ternary numeration but employing binary code.

The circuits of this invention perform computations with signals having discrete values which are representative of numerical digits in a ternary or radix three system of numeration and utilize circuit components of a binary nature. A binary system of numeration employs but two digits: 0 and 1; while the ternary system usually employs three digits which may be 0, 1, 2, or −1, 0, 1.

An introduction to the ternary numeration system may be found in an article by Morris and Alexander in "Electronic Engineering," Sept. 1960, pp. 554–557.

A symmetric ternary (ST) system employing the digits +1, 0, −1 provides a system of numeration which requires devices capable of assuming three alternative stable state conditions. It is desirable to provide a system which will permit the utilization of devices having only two stable states.

The present invention employs a novel binary-coded symmetric-ternary (BCST) system of numeration in which any denary integer is represented as an $n$th-order expression or sequence of $2n$ symbols or digits, each of which is either a 0 or a 1, where $n$ is a positive natural number. The midpoint of the sequence, for convenience in reading, may be interrupted by a slant bar (/), as shown below. The ordered pair of symbols whose first (or positive) member is the 0 or 1 to the left of the slant bar and whose second (or negative) member is the 0 or 1 to the right of the slant bar is called the first-order digit of the expression. The second order digit is the second 0 or 1 to the left of the slant bar paired with the second 0 or 1 to the right thereof. The $n$th-order digit consists of the ordered pair of digits whose positive member is the $n$th 0 or 1 to the left of the slant bar and whose negative member is the $n$th 0 or 1 to the right of the slant bar. Thus, the positive member of the first-order digit has weight +1, and the negative member −1, while for the $n$th-order digit, the positive member has weight $3^{(n-1)}$, and the negative member has weight $-[3^{(n-1)}]$.

A comparison of integer representation in denary and this binary-coded, symmetric ternary code follows:

| Denary: | BCST |
|---|---|
| 0 | 0/0 |
| 1 | 1/0 |
| 2 | 10/10 |
| 3 | 10/00 |
| 4 | 11/00 |
| 5 | 100/110 |
| 6 | 100/010 |
| 7 | 101/010 |
| 8 | 100/100 |

In this code, only three of the possible four pairs of binary code digits are used, and the fourth possible pair is treated as an invalid pair. For example, in the illustrated embodiment, only (1/0); (0/0); and (0/1) are used as code digits, and (1/1) is a prohibited pair. Any integer can be uniquely represented by a BCST expression of the aforementioned type.

The complement, or the additive inverse of a BCST expression may be formed by interchanging the members of each BCST digit, i.e., copying the expression backwards.

The process of counting may be thought of as the successive addition of +1, if the counting is forwards, or of −1, if the counting is backwards. The increment (+1 or −1) is added to the lowest order BCST digit; carries, if any, are propagated outwardly from the slant bar, positive carries to the left and negative carries to the right as follows:

| Given BCST digit | Result of adding +1 | | Result of adding −1 | |
|---|---|---|---|---|
| | Sum | Carry (left) | Sum | Carry (right) |
| (1/0) | (0/1) | +1 | (0/0) | 0 |
| (0/0) | (1/0) | 0 | (0/1) | 0 |
| (0/1) | (0/0) | 0 | (1/0) | −1 |

It is an object of this invention to provide a new and improved computer system.

Another object is to provide a new and improved computer system incorporating two-state devices and operating in a ternary numeration system.

Another object is to provide a new and improved system for arithmetically operating in a binary coded symmetric ternary code and for converting to and from a ternary code.

A feature of this invention is an electrical network having at least a pair of input and a pair of output lines adapted to receive input signals representative of digits in binary coded symmetric ternary numeration, to perform arithmetic operations upon said digits, and to provide output signals representative of digits in binary coded symmetric ternary numeration with represent the result of said arithmetic operations.

The invention, its features and its objects may be more fully understood from the following description considered in connection with the accompanying drawings, in which several embodiments of the invention are illustrated. The drawings are for the purpose of illustration and description only and are not intended as a definition of the limits of the invention.

Corresponding parts are referenced in the drawings by similar numerals throughout.

BCST digit sets are represented by utilizing two conductors; one conductor carries signals representing positive digits, i.e., digits to the left of the slant bar, and the other conductor carries signals representing negative digits, i.e., digits to the right of the slant bar. For electronic devices, a suitable voltage level is impressed on one of the conductors to represent a 1 or a 0 digit, and may be, for example, a positive voltage level (or a pulse) or zero voltage level (or the absence of a pulse), respectively. Symmetric ternary digits are represented by suitable voltage levels on a single conductor. The digits +1, 0, −1 may be, for example, a positive voltage, zero voltage, and a negative voltage, respectively. Analogous signal types are utilized for electromechanical relay devices, as noted below in the discussion thereof.

Figure 1:
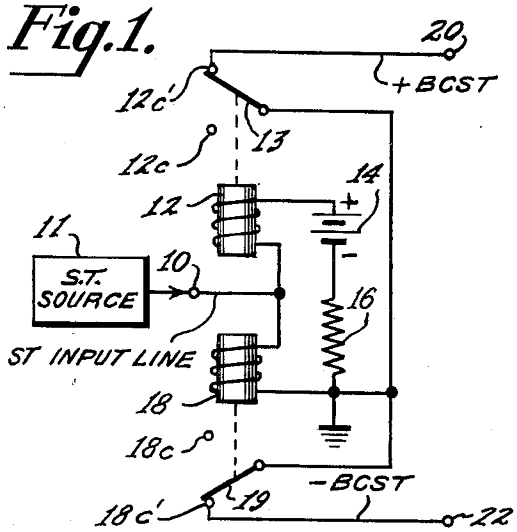
FIGURE 1 is a schematic circuit diagram of a code converter embodying this invention and utilizing relays for converting from ST to BCST.

ST signals are converted to BCST signals by the relay circuit shown in FIGURE 1. The source 11 of the ST signals may be, for example, the storage device discussed in the Morris and Alexander paper referred to above, with appropriate means for supplying the signals in a form suitable for relay operation. The ST signals applied to input terminal 10 are as follows: +1: B+ voltage; 0: floating or open circuit; and −1: ground. The input terminal 10 is connected to one terminal of a relay coil 12, the other terminal of which is connected to the positive terminal of a battery 14, the negative terminal of which is connected to one end of a load resistor 16 which is returned to ground. One end of a second relay coil 18 is also grounded, and the other end is connected to the input terminal 10. Relay coil 12 has a normally open fixed switch contact **12*c* and a normally closed fixed switch contact 12*c*′. Relay coil 18 has a normally open switch contact 18*c* and a normally closed contact 18*c*′. The positive BCST output terminal 20 is connected through contact 12*c*′ and the movable contact 13 to ground, and the negative BCST output terminal 22 is connected through contact 18*c*′ and the movable contact 19** to ground.

When a positive signal representing +1, equal to the voltage of battery 14, or B+, is applied to terminal 10, relay 18 is energized to open contact **18*c*′ leaving terminal 22 floating. Relay 12 is not energized, and contact 12*c*′ remains closed, leaving terminal 20 grounded. When a floating input signal is applied to terminal 10 to indicate 0, both relays 12 and 18 are energized opening both contacts 12*c*′ and 18*c*′, respectively, and leaving both terminals 20 and 22 floating. When ground is applied to terminal 10 to indicate −1, relay 12 is energized to open contact 12*c*′, leaving terminal 20 floating. Relay 18 is not energized, and contact 18*c*′ remains closed, leaving terminal 22** grounded. This code conversion may be summarized as follows:

| ST | ST input | BCST | +BCST output | −BCST output |
|---|---|---|---|---|
| +1 | B+ | 1/0 | Ground | Floating. |
| 0 | Floating | 0/0 | Floating | Do. |
| −1 | Ground | 0/1 | do | Ground. |

It will be appreciated that an output connection to ground provides an output signal current, while an output which is floating provides no output signal current.

Figure 2:
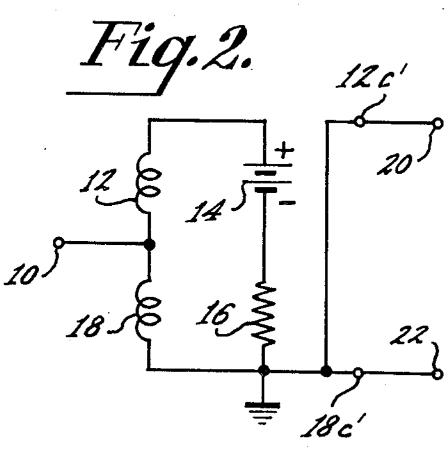
FIGURE 2 is another schematic circuit diagram of the converter of FIGURE 1, and illustrates the drawing conventions for relay circuits employed in this disclosure.

FIG. 2 is a schematic diagram of the circuit of FIG. 1 and indicates the relay and contact representation which will be followed hereinafter. Note that the contacts with the primed reference numerals are normally closed. The relation of the contacts of FIG. 2 to those of FIG. 1 will be apparent from the corresponding reference numerals.

Figure 3:
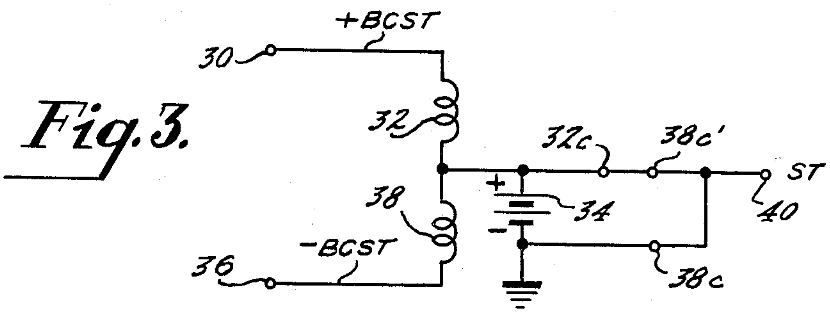
FIGURE 3 is a schematic circuit diagram of a code converter embodying this invention utilizing relays for converting from BCST to ST.

BCST signals are converted to ST signals by the relay circuit of FIG. 3; the operational relationship is the converse of that shown in FIGS. 1 and 2. The positive BCST input terminal 30 is connected to one end of a relay coil 32, the other end of which is connected to the positive terminal of a battery 34; the negative battery terminal is connected to ground. The negative BCST input terminal 36 is connected to one end of a relay coil 38, the other end of which is connected to the positive terminal of battery 34. The ST output terminal 40 is serially connected through normally closed relay contact 38c′ and normally open contact **32*c* to the positive terminal of the battery 34 and is connected through normally open relay contact 38*c* to ground. When ground is applied to terminal 30 and a floating signal is applied to terminal 36, relay 32 is energized closing contact 32*c*. Relay 38 is not energized, leaving contact 38*c*′ closed and 38*c* open, thereby completing the circuit between terminal 40 and the positive terminal of battery 34. Thus, a B+ output signal appears at terminal 40. When ground is applied to terminal 36 and a floating signal is applied to terminal 30, relay 38 is energized, closing contact 38*c* to connect terminal 40 to ground, and opening contact 38*c*′ to disconnect terminal 40 from the positive terminal of the battery 34. When floating signals are applied to both terminals 30 and 36, neither relay is energized, both contacts 32*c* and 38*c* remain open, and terminal 40** is disconnected from both the battery and ground; i.e. floating. This code conversion may be summarized as follows:

| BCST | +BCST input | −BCST input | ST | ST output |
|---|---|---|---|---|
| 1/0 | Ground | Floating | +1 | B+ |
| 0/0 | Floating | do | 0 | Floating. |
| 0/1 | do | Ground | −1 | Ground. |

Thus, the output signals assume three forms: (1) the output terminal is connected to B+ voltage to provide a signal current in a first direction; (2) the output terminal is floating so that there is no signal current; and (3) the output terminal is connected to ground to provide a signal current in the opposite direction.

The basic arithmetic element of a digital computer is an adder which adds two or three digit signals together to obtain a sum digit signal and a carry digit signal.

To generalize, let the integer A be represented by a BCST expression A of *n*th order; i.e. A is the expression $$a_n a_{n-1} \ldots a_1/a_{-1} \ldots a_{-n+1} a_{-n}$$

where $$a_j = 0 \text{ or } 1, \; -n \leq j \leq n$$

Similarly, let the integer B be represented by the BCST expression $$B = b_n b_{n-1} \ldots b_1/b_{-1} \ldots b_{-n+1} b_{-n}$$

To form the integer $S = A + B$, it is necessary to obtain the $(n+1)$—order BCST expression $$S = s_{n+1} s_n \ldots s_1/s_{-1} \ldots s_{-n} s_{-n-1}$$

This can be accomplished by adding the digits $a_1/a_{-1}$ and $b_1/b_{-1}$ according to the "half add" rules of Table I to form the sum digit $s_1/s_{-1}$ and a carry digit $c_1/c_{-1}$. Recursively, $s_k/s_{-k}$ and $c_k/c_{-k}$ are obtained from the digit triple $$a_k/a_{-k},\; b_k/b_{-k},\; c_{k-1}/c_{-(k-1)}$$

by the "add" rules of Table I. Finally $$s_{n+1}/s_{-n-1} = c_n/c_{-n} \text{ and } c_{n+1}/c_{-n-1} = 0/0$$

Table I is a function table of BCST addition performed in an adder:

TABLE I

| *L-R* | Sum | Carry |
|---|---|---|
| +3 | 0/0 | 1/0 |
| +2 | 0/1 | 1/0 |
| +1 | 1/0 | 0/0 |
| 0 | 0/0 | 0/0 |
| −1 | 0/1 | 0/0 |
| −2 | 1/0 | 0/1 |
| −3 | 0/0 | 0/1 |

In Table I, R is the number of 1's appearing to the right of the slant bar in the digit set to be added and L is the number of 1's to the left of the slant bar. The difference between L and R ($L-R$) is the effective input. In a half adder only the $L-R$ functions between +2 and −2 are performed; in a full adder all are performed.

The several values of $L-R$ in Table I are obtained from the various possible augend and addend inputs as shown in Table II.

TABLE II

| L−R | Addend input | Augend input |
|---|---|---|
| +2 | 1/0 | 1/0 |
| +1 | 1/0 | 0/0 |
| +1 | 0/0 | 1/0 |
| 0 | 1/0 | 0/1 |
| 0 | 0/0 | 0/0 |
| 0 | 0/1 | 1/0 |
| −1 | 0/0 | 0/1 |
| −1 | 0/1 | 0/0 |
| −2 | 0/1 | 0/1 |

Figure 4:
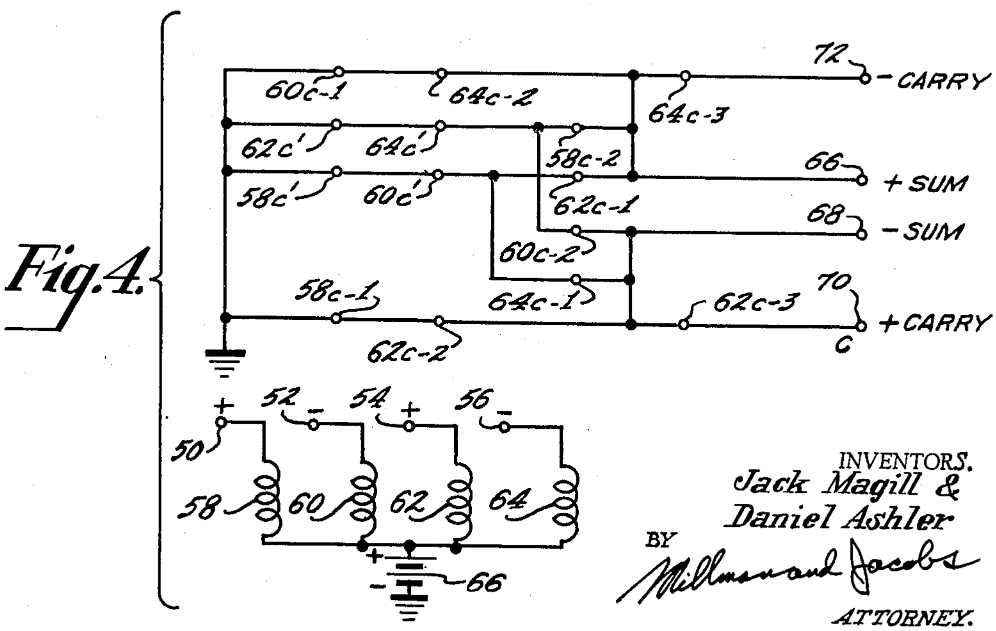
FIGURE 4 is a schematic circuit diagram of a BCST half adder embodying this invention and utilizing relays.

FIG. 4 is a schematic circuit diagram of a BCST half adder which uses relays. The pair of signals forming the BCST addend digit are applied to positive and negative input terminals 50 and 52, and the augend digit signals are applied to positive and negative input terminals 54 and 56. The input terminals 50, 52, 54, and 56 are respectively connected to one end of relay coils 58, 60, 62, and 64. The other end of each of the coils is connected to the positive terminal of a battery 66 which is returned to ground. Each of the coils operates a plurality of contacts which are interconnected to form signal paths to the positive and negative sum output terminals 66 and 68, respectively, and the positive and negative carry output terminals 70 annd 72, respectively.

The contact reference numerals correspond to those of the associated relay coils; the reference letter is used in addition to indicate the contact portions of the relay; the primed numerals indicate normally closed contacts, and the unprimed numerals indicate normally open contacts. Where more than one open or closed contact is used with the same relay coil, these contacts are further individually numbered; for example, 64*c*–3 is the third normally open contact of relay coil 64.

The digit combination 1/1 is not used and does not occur, and therefore, contacts 58*c*–2 and 60*c*–2 are not concurrently closed, and contacts 62*c*–1 and 64*c*–1 are not concurrently closed.

The operation of FIG. 4 is in accordance with Tables I and II above. The positive sum output terminal 66 is connected to ground when $L-R$ is +1 or −2. The digit sets 1/0 and 0/0 are added by supplying a ground signal to terminal 50, energizing relay coil 58, and supplying a floating signal to terminals 52, 54, and 56, leaving relay coils 60, 62, and 64, respectively, unenergized. Thereby, the circuit is completed between positive sum output terminal 66 and ground via contacts 62*c*′, 64*c*′, and 58*c*–2. The other terminals are all floating under these conditions since each of the associated signal paths have at least one open contact. Similarly, adding 0/0 and 1/0 completes the circuit via contacts 58*c*′, 60*c*′, and 62*c*–1 to ground. The digit pairs 0/1 and 0/1 are added by supplying a ground signal to terminals 52 and 56 to energize relay coils 60 and 64, respectively, and by supplying a floating signal to terminals 50 and 54 which leaves relay coils 58 and 62, respectively, unenergized. Thereby, the circuit is completed from sum terminal 66 via contacts 60*c*–1 and 64*c*–2 to ground.

The negative sum output terminal 68 is connected to ground when $L-R$ is −1 or +2. When the digit sets 0/1 and 0/0 are added, terminal 68 is grounded by way of contacts 62*c*′, 64*c*′, and 60*c*–2. Similarly, terminal 68 is grounded for the sum of 0/0 and 0/1 by way of contacts 58*c*′, 60*c*′, and 64*c*–1; and for the sum of 1/0 and 1/0, by way of contacts 58*c*–1, 62*c*–2, and 62*c*–3.

The positive carry output terminal 70 is connected to ground only when $L-R$ is +2, which occurs only during adding 1/0 and 1/0 and via contacts 60*c*–1, 64*c*–2, and 64*c*–3 (concurrently with sum terminal 68 being grounded). The negative carry output terminal 72 is connected to ground only when $L-R$ is −2 by way of contacts 60*c*–1, 64*c*–2, and 64*c*–3 (concurrently with sum terminal 66 being grounded). One feature of each of the signal paths of this half adder is that of effectively cancelling the input digit pairs of 1/0 and 0/1; one for the addend and the other for the augend. The sum and carry outputs are each 0/0 since the paths of series contacts each have at least one open contact under this condition.

FIG. 4 thus shows a logic circuit which performs half adder functions of Table I and thus is a BCST half adder which utilizes current sensitive devices having two states.

Figure 5:
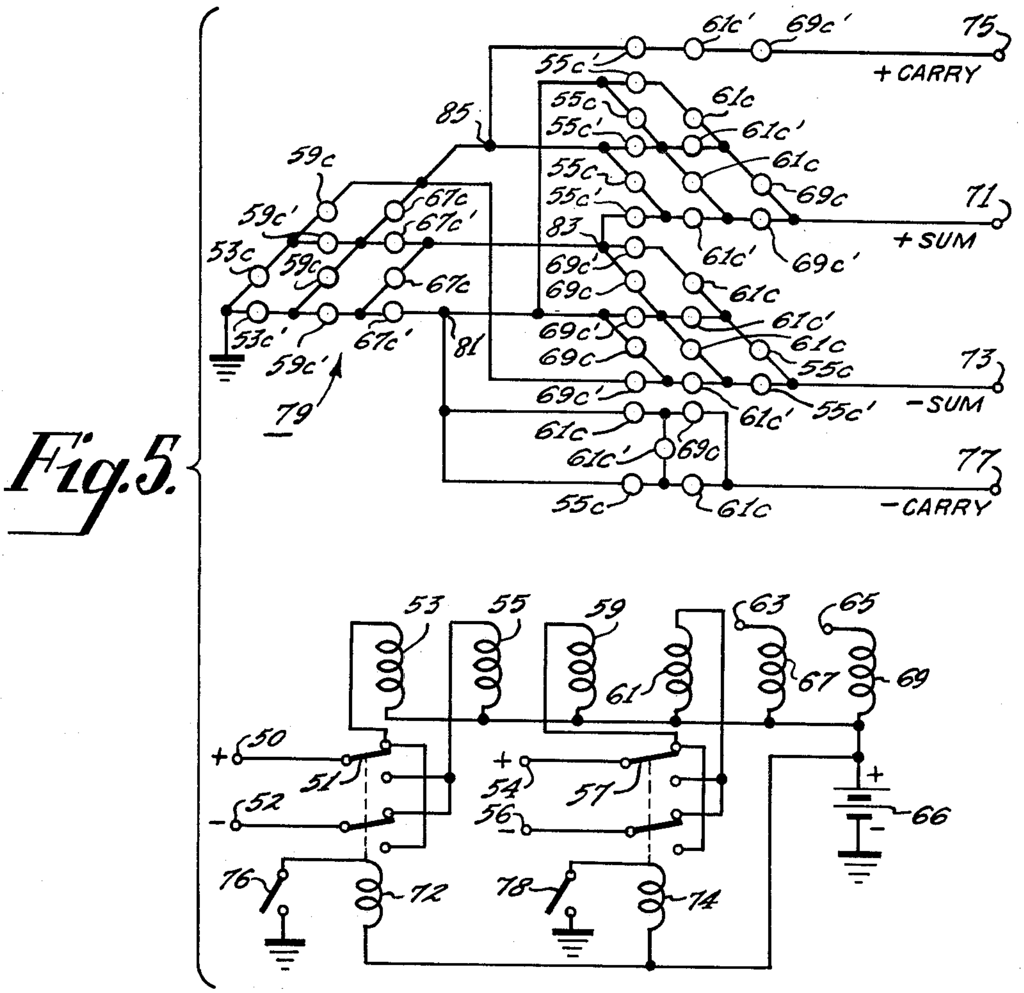
FIGURE 5 is a schematic circuit diagram of a BCST full adder embodying this invention and utilizing relays.

In FIG. 5 a full BCST adder using relay switching circuits is shown. The addend signal pair is supplied to terminals 50 and 52 and via a double-pole double-throw relay switch 51 to relay coils 53 and 55, respectively, which are connected to the positive terminal of battery 66. The augend signal pair is supplied to terminals 54 and 56 and via a double-pole double-throw relay switch 57 to relay coils 59 and 61, respectively, which are similarly energized by battery 66. The carry signal pair is supplied to terminals 63 and 65 of relay coils 67 and 69. The relay switches 51 and 57 are individually actuated by relay coils 72 and 74, which are energized by battery 66 and by individual ground signals applied thereto via switches 76 and 78, respectively. The actuation of switches 76 and 78 generate control signals for performing a subtract operation.

The contacts of the input digit coils are arranged in signal paths in accordance with Table I and Table II. These paths are connected between ground and the sum output terminals 71 and 73 and the carry output terminals 75 and 77. The contacts associated with the left-digit coils 53, 59, 67 are connected in a net 79 of signal switching paths originating at ground. The reference numerals for the contacts correspond to the associated relay coil with normally closed contacts having the prime (′) and normally open contacts being unprimed. The contacts of each relay are separate ones and are referenced by the same numerals. The net has three output terminals 81, 83, 85 which are respectively associated with the sums of the left digits of the input pairs being 0, 1, and 2 or 3, respectively. The contacts of net 79 are interconnected so that the signal paths are completed to its output terminals in accordance with the corresponding conditions of the associated input coils 53, 59, and 67.

The positive sum output terminal 71 is connected via a net 87 of different signal paths to the terminals 81, 83, and 85. The contacts of the net 87 are associated with the right-digit coils 55, 61, and 69, and are arranged so that the sum output terminal 71 is grounded when the difference $L-R$ is equal to +1 or −2. The negative sum output terminal 73 is connected to the terminals 81, 83, and 85 via a net 89, the contacts of which are associated with the right-digit coils 55, 61, and 69. The contacts of net 89 are arranged so that negative sum terminal 73 is grounded when $L-R$ equals −1 or +2. The positive carry terminal 75 is connected to terminal 85 by normally closed contacts of each of the right-digit coils 55, 61, and 69, so that the positive carry terminal is grounded when $L-R$ equals +3 or +2. The negative carry terminal 77 is connected to terminal 81 by a net 91 of contacts of the right-digit coils 55, 61, and 69, which contacts are arranged to connect terminal 77 to ground when $L-R$ equals −3 or −2.

Thus, the network of FIG. 5 operates as a full adder for BCST in accordance with function Table I. The carry output terminals 75 and 77 are respectively connected to carry input terminals 63 and 65 via delay units of a single digit time delay and of the type described below. Thereby, each set of addend and augend digits is added with the carry generated by the addition of the previous set of input digits in a well known fashion.

The BCST code system of this invention lends itself to subtraction by the adder of FIG. 5. If the digit pair at terminals 54, 56 are to be subtracted from those at terminals 50, 52, a ground control signal is applied via switch 78 to coil 74. Thereby, switches 57 are actuated to reverse the connections of terminals 54, 56 so that they are connected to coils 61 and 59, respectively. The addition process is performed in the same manner as described above, but instead of an augend of 1/0, for example, it becomes 0/1. But the latter digit pair is the negative of the former, and the addition process is effectively subtraction. In a similar fashion, the relay 72 may be independently actuated to change the sign of the addend signal pair. Thus, either input signal pair may be subtracted from the other by the control switches 76 or 78.

Figure 6:
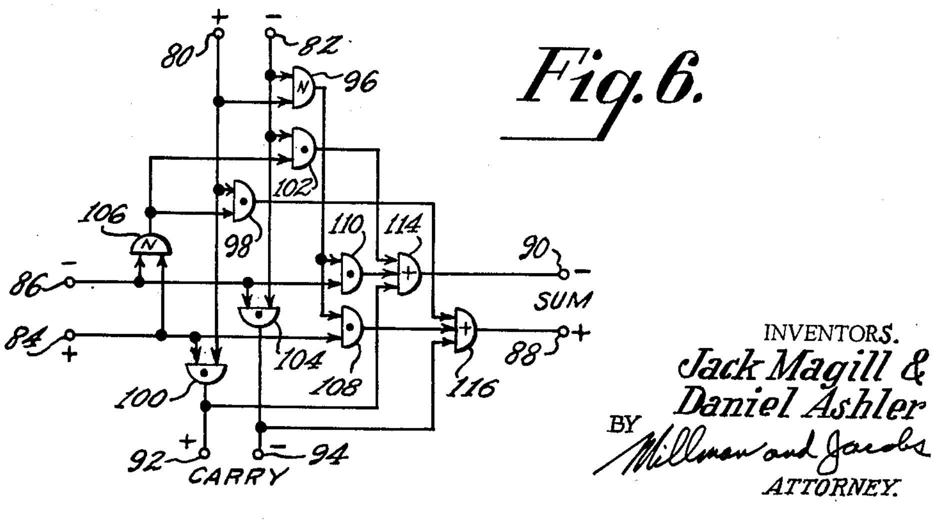
FIGURE 6 is a schematic logic diagram of a BCST half adder embodying this invention and utilizing logic gates.

FIG. 6 shows a BCST half adder which is mechanized from AND, OR, and NOR gates, each having two or more inputs and a single output line. The various gates are well known in the art and may be individually constructed in appropriate ways such as by diode logic with suitable amplifier inverters. Their functions are defined as follows: In an OR gate, if any input voltage is high (a voltage level or pulse), then the output voltage is correspondingly high; and if, and only if, all input voltages are low (a voltage level or the absence of a pulse), is the output voltage low. In an AND gate, if, and only if, all input voltages are high, is the output voltage high; if any input voltage is low, then the output voltage is low. In a NOR gate, if, and only if, none of the input voltages is high, then the output voltage is high; if any input voltage is high, the output voltage is low.

The half adder has a pair of addend input terminals 80 and 82, respectively, a pair of augend input terminals 84 and 86, respectively, a pair of sum output terminals 88 and 90, respectively, and a pair of carry output terminals 92 and 94, respectively. The positive addend terminal 80 is connected as an input to a NOR gate 96, an AND gate 98, and an AND gate 100. The negative addend terminal 82 is connected as an input to the NOR gate 96, an AND gate 102, and an AND gate 104. The positive augend terminal 84 is connected as an input to a NOR gate 106, to the AND gate 100, and to an AND gate 108. The negative augend terminal 86 is connected as an input to the NOR gate 106, to the AND gate 104, and to the AND gate 110. The output of the NOR gate 96 is connected as an input to the AND gate 110 and to the AND gate 108. The output of the NOR gate 106 is connected as an input to the AND gate 98 and to the AND gate 102. The outputs of the AND gates 102, 110, and 100 are connected as the inputs to an OR gate 114, the output of which is connected to the negative sum output terminal 90. The outputs of the AND gates 98, 108, and 104 are connected as the inputs to an OR gate 116, the output of which is connected to the positive sum output terminal 88. The output of the AND gate 100 is also connected to the positive carry output terminal 92. The output of the AND gate 104 is also connected to the negative carry output terminal 94.

The positive sum terminal 88 is high with a 1-output when $L-R$ is $-2$ (the case of 0/1+0/1 when AND gate 104 is enabled) and when $L-R=+1$ (the cases of 1/0+0/0 and 0/0+1/0 when AND gates 98 and 108, respectively, are enabled). Similarly, negative sum terminal 90 has a 1-output when $L-R$ is $+2$ (the case of 1/0+1/0) when AND gate 100 is enabled; and when $L-R=-1$ (the cases of 0/0+0/1 and 0/1+0/0) when AND gates 110 and 102, respectively, are enabled. Positive carry output terminal 92 has a 1-output when $L-R$ is $+2$ (the case of 1/0+1/0) when AND gate 100 is enabled. Negative carry output terminal 94 has a 1-output when $L-R$ is $-2$ (the case of 0/1+0/1) when AND gate 104 is enabled.

For the input digit pairs of 1/0 and 0/1 the sum and carry outputs are each 0/0 since the AND gates each remain closed. That is, the logic is arranged so that these input pairs are effectively cancelled.

To repeat the prior example of adding 1/0 and 1/0, a high voltage (or pulse) is applied to terminal 80 and a low voltage (or no pulse) to terminal 82 to indicate the addend digit of 1/0, and a pulse is applied to terminal 84 and no pulse to terminal 86 to indicate the augend digit of 1/0. One of each of the inputs of NOR gate 96 and NOR gate 106 is high and, therefore, each output is low, and no pulse is transmitted to either AND gates 110 or 108 from NOR 96, or to AND gates 98 or 102 from NOR 106. There is no pulse on either input to AND gate 110 and its output is low. There is no pulse on both inputs to AND gate 108 and its output is low. There is no pulse on both inputs to AND gate 98 and its output is low. There is no pulse on either input to AND gates 102 and its output is low. There is a pulse, however, on both of the inputs to AND gate 100 and, therefore, its output is high, and a pulse appears at positive carry terminal 92 and also at an input to OR gate 114 which, in turn, has a high output, providing a pulse to negative sum terminal 90. Neither of the inputs to AND gate 104 is high and, therefore, its output is low and no pulse appears at negative carry terminal 94. None of the inputs to OR gate 116 is high and, therefore, its output is low and no pulse appears at positive sum terminal 88. The result, therefore, of adding 1/0 and 1/0 is a sum of 0/1 and a carry of 1/0. In a similar fashion, the other functions of Table I are also performed, and the operation will be apparent from the foregoing description.

FIG. 6 thus shows a logic circuit which conforms to the BCST half adder functions of Table I and which utilizes voltage sensitive devices having two states.

The half adder of FIG. 6 or that of FIG. 4 may also be used to perform subtraction in the manner described above for FIG. 5. That is, the addend and augend inputs of FIG. 4 are connected to the associated pairs of coils via switches such as the switches 51 and 57 so that each digit pair is reversed for subtraction. In a similar fashion, in FIG. 6, each input digit pair is reversed by switching their connections. For this purpose, suitable gate circuits may be used in a well known fashion in place of the relay circuits.

Figure 7:
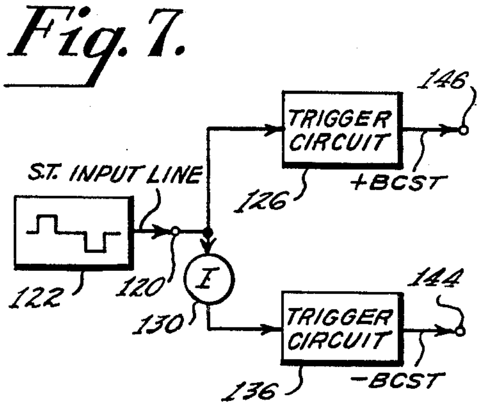
FIGURE 7 is a schematic circuit diagram of an electronic code converter embodying this invention for converting from ST to BCST.

ST signals may also be converted to BCST by electronic devices such as is shown in FIG. 7. An input terminal 120 receives ST signals from a suitable source 122 in the form of a high voltage level or pulse, an intermediate or reference level (no pulse), or a low voltage voltage level or pulse. Terminal 120 is connected directly to the input terminal of a Schmitt trigger circuit 126 and to the input terminal of an inverter 130 which has its output terminal connected to the input terminal of a similar trigger circuit 136. Suitable inverters (such as a normally-conducting amplifier) and Schmitt trigger circuits are well known in the art. When the input of the inverter is low, its output is high; when the input is at an intermediate or reference level, its output is also at an intermediate or reference level; and when the input is high, its output is low. An example of this is a normally-conducting inverting amplifier whose normal output is established as the reference level and whose outputs are inverted forms of pulse inputs; a suitable level setting circuit may also be provided in the output. Output terminals 144 and 146 from the trigger circuits 136 and 126, respectively, are used as the − and +BCST lines. The Schmitt trigger is a circuit that is triggered from one state to an opposite one when an input trigger voltage increases beyond a certain triggering level, and is restored to its initial state when the input voltage falls below the triggering level. Suitable level setting circuits are provided in the outputs of the trigger circuits to provide appropriate BCST signals.

Schmitt trigger circuits normally have two possible output connections, one of which supplies the inverted form of the triggering signal, and the other supplies the uninverted form. The output terminals 144 and 146 receive the uninverted signals from the respective trigger circuits. Thus, terminal 146 is low when the input terminal of trigger circuit 126 receives a low or intermediate level signal (due to appropriate input biasing of the trigger circuit 126 to prevent triggering at the intermediate level), and terminal 146 is high when the input signal is high. The outputs of trigger circuit 136 are of the same type.

In operation, when the ST signal from source 122 is an intermediate level, that level is supplied as the input to each trigger circuit 126 and 136, and the BCST outputs are both at the low signal level. When the ST signal is a high level, trigger circuit 126 is triggered and the +BCST terminal 146 is high, but trigger circuit 136 is not triggered (due to the action of inverter 130), and the —BCST terminal is low. When the ST signal is low, that signal is inverted by inverter 130 and triggers the trigger circuit 136, while trigger circuit 126 remains unchanged. Consequently, the +BCST and —BCST terminals 146 and 144 are respectively low and high. Accordingly, the circuit of FIG. 7 is effective to carry out the conversion operation in a manner analogous to that of FIGS. 1 and 2, described above.

Figure 8:
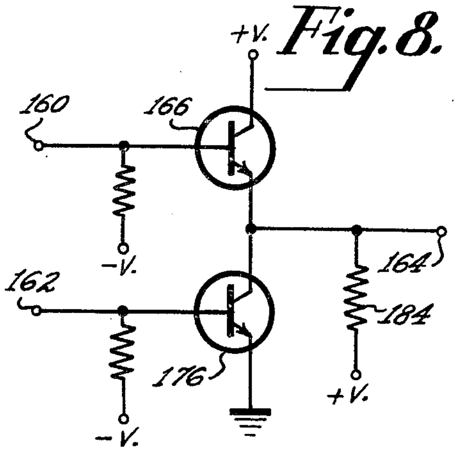
FIGURE 8 is a schematic circuit diagram of an electronic code converter embodying this invention for converting from BCST to ST.

BCST signals may be converted to ST signals by electronic circuitry also. FIG. 8 shows a converter circuit having a +BCST input terminal 160, a —BCST input terminal 162, and an ST output terminal 164. An NPN transistor 166 has its collector electrode connected to a positive voltage supply, its base electrode connected to terminal 160, and its emitted electrode connected to terminal 164. Another NPN transistor 176 has its collector electrode connected to terminal 164, its base electrode connected to terminal 162, and its emitter electrode connected to ground. A resistor 184 is connected between terminal 164 and an intermediate voltage level. A suitable level setting circuit may be connected to the output terminal 164 for obtaining desired output signal levels.

In operation, each of the transistors 166 or 176 is normally biased to cut off with an input signal at a low level or ground. Therefore, no current flows through resistor 184, and output terminal 164 is at ground level. When a high voltage is impressed on terminal 160 and a low voltage is impressed on terminal 162, transistor 176 is cut off while transistor 166 conducts through resistor 184. The voltage level of junction 174 rises, and a positive pulse appears at terminal 164. When a low voltage is impressed on terminal 160 and a high voltage is impressed on terminal 162, transistor 166 is cut off, and transistor 176 conducts through resistor 184. The voltage level of junction 174 falls, and a negative pulse appears at terminal 164. Thus, the converter of FIG. 8 operates in a manner analogous to the converter of FIG. 3, described above.

Since the BCST digit pair 1/1 does not occur, terminals 160 and 162 do not both have a high voltage level impressed thereon concurrently. Should it be desired to prevent damage from both transistors being placed into conduction, suitable impedances may be placed in series therewith.

Figure 9:
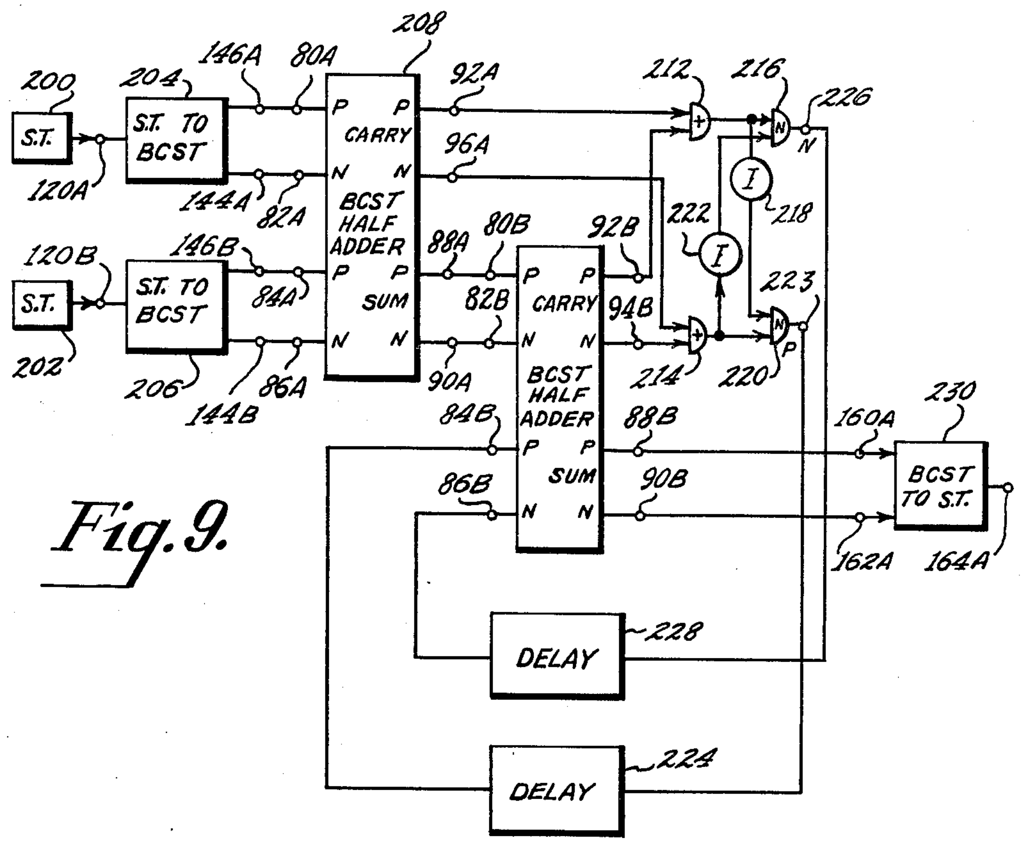
FIGURE 9 is a schematic diagram of a computing system embodying this invention.

FIG. 9 shows a complete system which receives two trains of ST signals, least significant digits first, and concurrently converts both ST trains to BCST pair trains, adds both BCST pair trains together, and converts the sum BCST pair trains to a sum ST signal train. The system includes an addend ST signal source 200 and an augend ST signal source 202, which are respectively connected to the input terminals 120A and 120B of ST to BCST converters 204 and 206 (which may be similar to that shown in FIG. 7 or FIG. 1). Parts corresponding to those previously described are referenced by similar numerals with the addition of A or B. The positive and negative output terminals 146A and 144A of converter 204 are respectively connected to the positive and negative addend input terminals 80A and 82A, respectively, of a BCST half adder 208 which may be similar to that shown in FIG. 6 (or FIG. 4). Similarly, the output terminals of converter 206 are connected to the corresponding augend input terminals 84A and 84B of the half adder 208. The positive and negative sum output terminals 88A and 90A of the half adder 208 is connected to the positive and negative addend input terminals 80B and 82B, respectively, of a similar BCST half adder 210. The positive carry output terminals 92A and 92B of half adders 208 and 210 are connected to inputs of an OR gate 212. The negative carry output terminals 96A and 96B are connected to inputs of an OR gate 214. The output of OR gate 212 is connected to one input of a NOR gate 216 and via an inverter 218 to the input of a NOR gate 220. The output of OR gate 214 is connected to a second input of the NOR gate 220 and via an inverter 222 to a second input of the NOR gate 216. The output of the NOR gate 220 at positive terminal 223 is connected to the input of a delay unit 224. The delay of unit 224 corresponds to the time of a digit pair; for example, to the duration of a signal pulse if such signals are used. The output of delay 224 is connected to the positive augend terminal 84B of half adder 210. The output of the NOR gate 216 at negative terminal 226 is connected to the input of a one-pulse delay unit 228 which is similar to unit 224. The output of delay 228 is connected to the negative augend terminal 86B of half adder 210. One-pulse delay units are well known in the art. They may be of a self-timing nature such as an electric delay line, or may be externally timed by a clock pulse which is synchronized with the input ST pulse trains. The positive and negative sum terminals 88B and 90B of half adder 210 are connected to the positive and negative input terminals 160A and 162A, respectively, of a BCST to ST converter 230 which may be similar to the converter shown in FIG. 8 (or FIG. 3). Converter 230 has an ST output terminal 164A which may be connected to an ST storage or other device in a known manner. The addend and augend ST pulse trains, in synchronism, are supplied to converter 204 and 206, respectively, which convert the addend ST pulse train to positive and negative pairs of BCST pulse trains consisting of regularly timed, sequential pulses and no-pulses (or voltage levels) synchronized with each other and the addend ST pulse train. If desired, suitable timing systems known in the art may be employed in the various portions of the system and in the units thereof to maintain synchronism. Thereby, transient signals at the signal changes may be prevented in a well known fashion. The BCST half adder 208, the BCST half adder 210, the two OR gates 212 and 214, the two inverters 218 and 222, and the two NOR gates 216 and 220 all constitute a BCST full adder. The full adder has three inputs: an addend input 80A, 82A, an augend input 84A, 86A, and a carry input 84B, 86B. It also has two outputs: a sum output 88B, 90B and a carry output 223, 226.

The OR gates, inverters, and NOR gates combine the carry outputs of the two half adders to provide a carry output for the full adder. That is, if there is 1/0 carry from either half adder, the 1-digit is passed by OR gate 212 and the 0-digit by OR gate 214. Due to the inverting action of the inverters and NOR gates, the 1-digit appears at the positive output terminal 223, and the 0-digit at the negative output terminal 226. Similarly, if either half adder supplies a 0/1 carry, the opposite relationships exist. However, if one half adder supplies a 1/0 carry and the other a 0/1 carry, these carries are effectively cancelled (since the inputs to each NOR gate are all 1's)

and the net carry is 0/0. If a relay system is employed, the gates of FIG. 9 may be replaced by corresponding relay switching circuits.

The function of the delays 224 and 228 is to deliver the carries, if any from terminals 223 and 226 to the augend inputs 84B and 86B of half adder 210 in synchronism with the arrival of the pulses of the next successive digits of the pulse trains to be added thereto.

The final train of sum signal pairs at terminals 88B and 90B are supplied to the input terminals 160A and 162A, respectively, of converter 230. The BCST signal trains are converted to an ST signal train by the converter 230 as described with respect to FIG. 8, and delivered to the ST output terminal 164A.

In operation, an ST digit is supplied synchronously by each of the sources 200 and 202 to the respective converter 204 and 206 to obtain corresponding pairs of BCST signals. These BCST signals are summed in the adder, and the sum signal pair is converted back to an ST digit by converter 230. The carry digit pair is stored in the delays 224 and 228 until the second two ST digits are converted to BCST and supplied to the half adder 208. Thus, the carry digit pair is added to the second pairs of BCST digits, and a second sum digit and second carry digit is obtained. This operation is repeated for each two ST digits with an ST sum digit obtained each time at terminal 164. When the last ST digits are supplied, the last carry digit is developed in a similar fashion, and at the following digit time that carry, via half adder 210, generates the last sum digit.

The system of FIG. 9 may also be used with the relay adder of FIG. 5 in place of the adder formed by two half adders.

Figure 10:
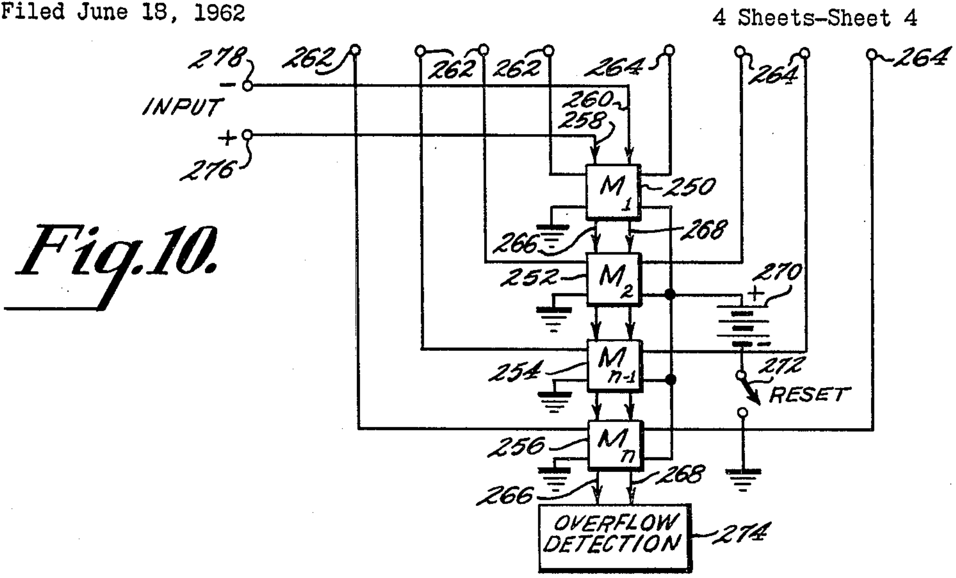
FIGURES 10, 11, and 12 are respectively a block diagram, a schematic circuit diagram, and a graphical operational diagram of a binary coded symmetric ternary counter embodying this invention.
Figures 11, 12:
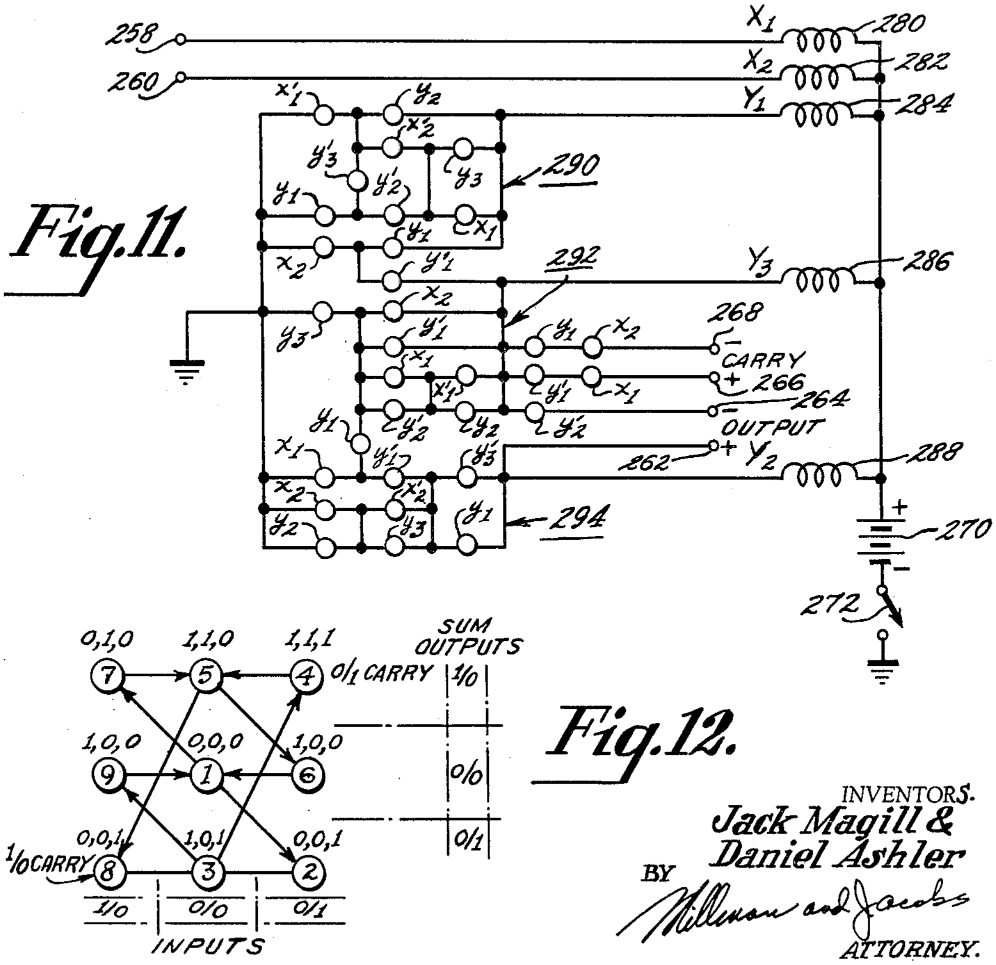

In FIGS. 10–12 a BCST counter is shown. In FIG. 10 four counter stages 250, 252, 254, 256 are connected in cascade. These stages are the same, and each includes positive and negative input terminals 258 and 260, positive and negative sum output terminals 262 and 264, and positive and negative carry output terminals 266 and 268. The positive and negative carry output terminals 266 and 268 of the first stage 250 form the corresponding input terminals 258 and 260 of the second stage 252, and so on for the remainder of the stages. In addition, a common power supply 270 for operating the stages is provided, and this power supply is connected via a reset switch 272 to a common ground return. An overflow detection device 274 is connected to the carry output terminals 266 and 268 of the last stage 256 to detect when there is either a positive or negative carry from that stage which would indicate an overflow of the counter. This overflow detection 274 may be any appropriate device or separate devices for detecting a binary signal on either line 266 or 268, or a BCST device such as one of those discussed above for recognizing the BCST signals appearing concurrently on lines 266 and 268.

The input lines 258 and 260 of the first stage 250 receive incrementing and decrementing signals at the input terminals 276 and 278, respectively. The input terminals 276 and 278 represent any suitable source of signals in binary form to be counted, which source may be a source of binary coded symmetric ternary signals or of any other binary signals.

In FIG. 11 a relay switching circuit of the sequential type is shown which has been used as a binary coded symmetric ternary stage and which may be used for each one of the identical stages 250–256 of FIG. 10. The positive and negative input terminals 258 and 260 are respectively connected to terminals of two relay coils 280 and 282 which are connected at their other terminals to the positive terminal of the direct current source 270. The input signals are at ground potential to represent an increment or binary-1, or are floating to represent a decrement or binary-0; the input signal combination at both terminals may be interpreted in BCST as described above. In any case, ground is applied to only one of the terimnals 258, 260 at any instant.

The input relay coils 280 and 282 are represented as X–1 and X–2 for the purpose of relating those relays to their contacts which are set forth in the switching combinations shown in the remainder of FIG. 11. The convention that is followed is that of the lower case symbol $x$ being utilized for a contact which is normally open, and the lower case symbol with the addition of a prime symbol, $x'$, representing a contact that is normally closed. Three other relay coils 284, 286, and 288 have one terminal connected to the battery 270, and the other terminal of each is connected to a switching circuit 290, 292, 294 that includes contacts from each of the two X-relays as well as the three Y-relays 284, 286, and 288. The equations of the logic of each of these switching circuits 290, 292, and 294 is represented as follows in Boolean algebra form:

$$Y_1=y_1y_2y'_3+x_1y_1y'_2+x'_1y_2+x'_1x'_2y_3+y_1y'_2y_3+x_2y_1$$
$$Y_2=x_1y'_1y'_3+x'_2y_2y'_3+x'_2y_1y_2+y_1y_2y_3+x_2y_1y_3$$
$$Y_3=x_2y_3+x_1y_2y_3+x_2y'_1+x'_1y'_2y_3+y'_1y_3+x_1y_1y_2$$

Each of the Y-relay coils 284, 286, and 288 is energized when it is connected to ground via the associated switching network 290, 292, and 294, respectively. The positive output terminal 262 is connected to the Y–2 relay 288, the negative output terminal 264 is connected via the switch contact $y$–$2'$ to Y–3, and the positive carry output terminal 266 is connected via $x$–1 and $y$–$1'$ to Y–3, and the negative carry output terminal 268 is connected via $x$–2 and $y$–1 to Y–3.

The sequential operation of the counter circuit of FIG. 11 is explained in connection with FIG. 12 which illustrates nine states of operation. Each of the states of operation is represented by a circle with a state-identifying numeral therein, and adjacent to each of these circles is a set of three binary digits representing the associated states of the Y–1, Y–2, Y–3 relays for that particular circuit state (the relay being energized is represented by 1, and the relay unenergized by 0). The numerals beneath the diagram represent the BCST input associated with each column of states, and the numerals to the right of the diagram represent the sum outputs that are produced for the associated row of states.

In operation, the circuit is reset by momentarily opening switch 272 to deenergize all of the relays. This reset state is represented as state-1, and the sum and carry output terminals 262, 264, and 266, 268 are all floating so that the sum and carry are each 0/0. As noted above, the inputs in this binary coded symmetric ternary system exclude the possibility of an increment and a decrement signal being received simultaneously (and when the inputs are in BCST, they change between 0/1 and 1/0 via 0/0). Assuming that the first signal is a decrement signal (i.e. 0/1) on terminal 260, the X–2 relay 282 is energized, resulting in Y–3 being energized via the path including contacts $x$–2 and $y$–$1'$. With Y–3 the only relay energized, the negative sum output terminal 264 is grounded via contact $y$–$2'$, and the positive terminal 262 is left floating. The circuit is then in state-2 with a sum output of 0/1 and a carry output of 0/0.

When the decrement signal on terminal 260 terminates, the Y–3 relay remains energized via the path $y$–3, $y$–$2'$, and $x$–$1'$. At the same time, Y–1 is energized when the decrement signal terminates via the path of $x$–$1'$, $x$–$2'$, and $y$–3. The network is then in state-3 which is a stable storing state with relays Y–3 and Y–1 energized and Y–2 deenergized. The sum output is 0/1 (and there are no carry outputs during the storing states-1, -3, and -5).

When the next decrement signal is received, X–2 is again energized, Y–3 continues energized (via $y$–3, $x$–2), and Y–1 continues energized (via $x$–2, $y$–1) and Y–2 becomes energized (via $x$–2, $y$–3, and $y$–1). The circuit is then in state-4 which produces a sum output of 1/0 and a carry output of 0/1. That is, this count in decimal form of −2 then being registered is handled in BCST fashion by the network as a sum output of +1 and a carry output to the next stage representing −3.

When the second decrement pulse terminates, Y–3 is deenergized, Y–1 remains energized (via *x*–1′ and *y*–2) and Y–2 remains energized (via *y*–2, *x*–2′, and *y*–1). The circuit is then in the stable state-5, at which the sum output of 1/0 is produced. The carry output during state-4 was propagated during the decrement pulse itself so that no carry signals exist in the storing state of the circuit.

When the third decrement input signal is received, Y–1 continues energized (via *x*–2, *y*–1), Y–2 becomes deenergized, and Y–3 continues deenergized. This state is represented as state-6 at which the output becomes 0/0.

Upon termination of this third decrement signal, all three Y relays are deenergized, and the circuit is restored to the initial state-1 at which the sum output is again 0/0. Thus, it is seen that three successive decremented pulses are counted in the circuit by successively passing through the states representing in decimal form −1, +1 and a carry of −3 and 0.

In a similar fashion, from state-1 the circuit counts successive increment pulses received on terminal 258 and passes successively from state-1 to state-7, state-5, state-8, state-3, state-9, and back to state-1. At state-7 the count of +1 is registered, at state-8 a count of −1 and a carry of +3 is registered, and at state-9 the circuit is returned to a sum output count of 0.

The circuit remains in one of the stable store states-1, -3, or -5 in the absence of an increment or a decrement pulse. From these stable states the circuit may pass to either of two stable states depending upon whether a decrement or an increment pulse is received. Thereby, intermixed increment or decrement pulses may be counted; where the source of signals is a train of BCST signals, the counter accumulates that train of signals.

The counter of FIG. 1 utilizing the counter stages of FIG. 11 may be used in any area where a counter is normally used. The counter of FIG. 10 is consistent with the previously described binary coded symmetric ternary system in that such information may be supplied to the input of the counter, and information in that same form is produced at the outputs 262, 264. Also, this BCST information at the outputs of the counter may be supplied to the adders previously described if it is desired to add the count registered in the counter to that of another counter or the signals from another source of BCST information.

In the counter stage of FIG. 11, the output signals are in BCST form consistent with BCST input signals that may be supplied. That is, the excluded signal combination of 1/1 cannot be derived at the sum output terminals 262, 264 because of switch contact *y*–2′ at terminal 264, which prevents these terminals from being grounded simultaneously. Similarly, contacts *y*–1 and *y*–1′ prevent the generation simultaneously of ground output signals at the carry terminals 266 and 268 to exclude a carry of 1/1. Moreover, a positive carry is produced only when a negative sum is produced and vice-versa; this feature is also a characteristic of the BCST half adder as indicated above.

Thus, with this invention binary circuitry and devices are used to process ternary information. Though the devices and circuitry are binary in nature, they are arranged to operate directly in symmetric ternary. Thereby, it is effective to process information originating in ternary form. In the binary system of this invention, symmetric ternary information signals are carried by two lines, each of which individually carries binary signals. The concurrent signal pairs on the two lines determine the ternary representation. Three signal pair combinations are utilized, and the presence of the fourth pair (for example, a binary 1 on each line) indicates an error and can be utilized for error checking. The system operates generally in binary fashion with the arithmetic devices arranged to effectively cancel the digit signal pairs 1/0 and 0/1 when they are to be summed, since one is the reverse of the other. The negative of each number is obtained merely by reversing the relative position of the representative signals on the two signal lines. Consequently, it is not necessary to complement numbers to perform subtraction; it is merely necessary to reverse the relative positions of the signals of each digit pair of the subtrahend. Moreover, each number effectively carries its own sign.

Various modifications of the system and its parts and features will be apparent to those skilled in the art. The invention is not limited in its scope except as set forth in the accompanying claims.

What is claimed is:

1. A counter circuit operating in binary coded symmetric ternary comprising a plurality of stages operatively connected in series and each having positive and negative input terminals, positive and negative sum output terminals, and positive and negative carry output terminals, means for supplying increment and decrement signals respectively to the positive and negative terminals of a first one of said stages, and means connecting the positive and negative carry terminals of each of the stages respectively to the positive and negative input terminals of the succeeding one of said stages, each of said stages including two circuits respectively associated with said sum output terminals, said circuits having two-state devices for supplying binary signals to said output terminals, and means interconnecting said circuits for producing a carry signal at said positive carry output terminal only when a negative sum output signal is produced and a carry signal at said negative carry output terminal only when a positive sum output signal is produced.

2. A counter circuit operating in binary coded symmetric ternary comprising a plurality of stages operatively connected in series and each having positive and negative input terminals, a pair of sum output terminals and a pair of carry output terminals, means for supplying increment and decrement signals respectively to the positive and negative input terminals of a first one of said stages, and means connecting the positive and negative carry terminals of each of said stages respectively to the positive and negative input terminals of the succeeding one of said stages, each of said stages including two circuits having two-state devices for supplying binary signals to said output terminals, and means interconnecting said circuits so that combinations of the same signals of one binary type or combinations of different binary signals are concurrently supplied to said output terminals of each pair, said interconnecting means including means for preventing signals of the other binary type from being supplied concurrently to said output terminals of each pair.

3. A computer circuit operating in binary coded symmetric ternary comprising a plurality of stages operatively connected in series and each having a pair of positive and negative input terminals, a pair of positive and negative sum output terminals, and a pair of positive and negative carry output terminals, means for supplying binary coded symmetric ternary signals to the pair of input terminals of a first one of said stages, and means connecting a pair of positive and negative output terminals of one of said stages respectively to the positive and negative input terminals of the succeeding one of said stages, each of said stages including circuits associated with said pairs of sum and carry output terminals having two-state devices for supplying binary signals to said output terminals and having means interconnecting said circuits for producing a carry signal at said positive carry output terminal only when a negative sum output signal is produced and a carry signal at said negative carry output terminal only when a positive sum output signal is produced.

4. A computer circuit as recited in claim 3 wherein said means for supplying binary-coded-symmetric-ternary signals includes a pair of input electrical lines, and means for supplying binary signals to said line pair combinatorially so that a combination of the same signals of one binary type of said lines represents one symmetric ternary digit and combinations of said one and the other type of binary signals on the lines represent a second and third ternary digit, and wherein each of said stages includes means for preventing signal combinations of said other type from appearing concurrently at said carry output terminals.

5. A computer circuit as recited in claim 3 wherein said stages are counter circuits connected as a binary coded symmetric ternary counter.

6. A computer circuit as recited in claim 3 wherein said stages are half adders connected as an adder.

7. A computer circuit as recited in claim 6 wherein each of said half adder stages includes two pairs of positive and negative input terminals, and means to interchange the signals on one of said input terminal pairs whereby said half adder stage functions alternatively for addition or subtraction.

8. A computer circuit as recited in claim 6 wherein each of said half adder stages includes two pairs of positive and negative input terminals, and wherein said computer circuit includes means for combining the carry output signals of two of said half adder stages and to cancel positive and negative carry signals concurrently produced by said half adder stages.

9. A computer circuit as recited in claim 6 wherein each of said half adder stages includes two pairs of positive and negative input terminals, and wherein said computer circuit includes means for cancelling similar signals concurrently supplied on the positive input terminal of one of said pairs and the negative input terminal of the other of said pairs.

References Cited by the Examiner

UNITED STATES PATENTS

| | | | |
|---|---|---|---|
| 2,673,293 | 3/54 | Eckert et al. | 328—92 |
| 2,693,907 | 11/54 | Tootill | 328—92 |
| 2,735,005 | 2/56 | Steele | 328—44 |
| 2,999,207 | 9/61 | Quynn | 328—44 |
| 3,001,706 | 9/61 | Trussell | 235—155 |
| 3,001,707 | 9/61 | Bird | 235—155 |
| 3,017,097 | 1/62 | Werme et al. | 235—168 |
| 3,072,333 | 1/63 | Rogal | 235—168 |
| 3,099,753 | 7/63 | Schmookler | 307—88.5 |
| 3,129,340 | 4/64 | Baskin | 307—88.5 |

MALCOLM A. MORRISON, *Primary Examiner.*